United States Patent
Greenwood (10) Patent No.: US 10,105,015 B2
(45) Date of Patent: Oct. 23, 2018

(54) WRAP STAND

(71) Applicant: YouCopia Products Inc, Chicago, IL (US)

(72) Inventor: Mark Greenwood, Arlington Hts., IL (US)

(73) Assignee: YOUCOPIA PRODUCTS INC., Chicago, IL (US)

( * ) Notice: Subject to any disclaimer, the term of this patent is extended or adjusted under 35 U.S.C. 154(b) by 5 days.

(21) Appl. No.: 15/440,614

(22) Filed: Feb. 23, 2017

(65) Prior Publication Data

US 2017/0245692 A1    Aug. 31, 2017

Related U.S. Application Data

(60) Provisional application No. 62/300,216, filed on Feb. 26, 2016.

(51) Int. Cl.
  *A47J 47/16*     (2006.01)
  *A47B 81/00*     (2006.01)
  *A47B 57/20*     (2006.01)

(52) U.S. Cl.
  CPC .............. *A47J 47/16* (2013.01); *A47B 57/20* (2013.01); *A47B 81/00* (2013.01)

(58) Field of Classification Search
  CPC .... A47J 47/16; A47F 5/12; A47F 5/13; A47F 5/0031; A47F 5/01; A47F 5/103; A47B 57/20; A47B 81/00; A47B 63/00; A47B 23/042; A47B 47/022
  See application file for complete search history.

(56) References Cited

U.S. PATENT DOCUMENTS

| | | | | | |
|---|---|---|---|---|---|
| 520,494 | A | * | 5/1894 | Parsons | A47F 7/175 |
| | | | | | 211/144 |
| 572,336 | A | * | 12/1896 | Dawson | B42F 17/02 |
| | | | | | 211/181.1 |
| 863,114 | A | * | 8/1907 | Stevens | A47B 23/042 |
| | | | | | 126/298 |
| 1,525,445 | A | * | 2/1925 | Hamilton | A47F 13/085 |
| | | | | | 211/181.1 |
| 2,068,028 | A | * | 1/1937 | Jernson | D06F 57/12 |
| | | | | | 211/104 |
| 2,195,919 | A | * | 4/1940 | Crilly | A47B 61/04 |
| | | | | | 211/106 |
| 2,409,268 | A | * | 10/1946 | Gerlich | A47L 23/20 |
| | | | | | 211/35 |
| 2,682,955 | A | * | 7/1954 | Moore | A43D 117/00 |
| | | | | | 211/104 |
| 4,248,352 | A | * | 2/1981 | White | A47F 5/0823 |
| | | | | | 211/106 |
| 4,666,201 | A | * | 5/1987 | Chap | A47J 47/16 |
| | | | | | 108/64 |
| 5,394,995 | A | * | 3/1995 | Lusk | A47F 7/175 |
| | | | | | 211/189 |
| D364,074 | S | * | 11/1995 | Yeh | D6/678.4 |

(Continued)

*Primary Examiner* — Ko H Chan
(74) *Attorney, Agent, or Firm* — Lowe Graham Jones PLLC (57) ABSTRACT

A wrap stand includes a central pillar with a number of slots arranged in columns to define pairs of slots for receiving one or more of a plurality of wires. The wires are formed as shelves when inserted into the pairs of slots, and include upwardly and downwardly extending tabs to prevent boxes of wrap or other articles from falling from the shelves.

15 Claims, 12 Drawing Sheets

(56) References Cited

U.S. PATENT DOCUMENTS

| | | | | |
|---|---|---|---|---|
| 5,641,081 A * | 6/1997 | Merl | ............... | A47B 47/022 |
| | | | | 211/103 |
| 8,286,808 B1 * | 10/2012 | Setlik | ............... | A47B 63/00 |
| | | | | 211/106.01 |
| D714,081 S * | 9/2014 | Simone | ............ | A47F 5/0018 |
| | | | | D6/675.4 |
| 9,839,329 B2 * | 12/2017 | Chu | ............... | A47J 47/16 |
| 2007/0295681 A1 * | 12/2007 | Colin | ............... | A47F 5/12 |
| | | | | 211/90.03 |
| 2015/0129518 A1 * | 5/2015 | Ho | ............... | A47J 47/16 |
| | | | | 211/41.2 |

* cited by examiner

WRAP STAND

PRIORITY CLAIM

This application claims the benefit of U.S. provisional application No. 62/300,216 filed Feb. 26, 2016, the contents of which are incorporated by reference.

BACKGROUND OF THE INVENTION

One of the most odd-shaped supplies that can be found in almost all kitchens is various types of food coverings. Typically, these would include wax paper, aluminum foil, parchment paper and plastic wrap. These products are commonly sold on paper tube rolls ranging from 12 to 24" in length and approximately 2" in diameter. The rolls are housed in long rectangular boxes of a variety of shapes depending on the product, and the volume of the product. Similarly, food storage bags such as those having a zip-type closure are also sold in such boxes, but which generally have yet another dimensional shape. As many people have multiple sizes and shapes of boxes for these various wraps, papers, foils, and bags, storage of these boxes can be awkward and often wastes cabinet space.

Currently, these supplies tend to be stored horizontally by the consumer in cabinet drawers or on wire organizers in cabinets or pantries. Some users also store them in vertical baskets on the back of cabinet doors or inside cabinet walls. Due to their non-uniform shape and length, storage of these items typically wastes a lot of space.

SUMMARY OF THE INVENTION

The wrap stand in accordance with the preferred invention is a tower structure that is vertically oriented and configured to sit on a cabinet shelf or pantry floor and hold up to four or more specially bent wires on one side, or in a preferred version on two sides.

In one version, the wires can be locked into any of a number of holes or slots in the structure in order to provide a shelf-like structure for the food covering or plastic bag boxes. Because there are a large number of holes oriented vertically on each side of the wrap stand structure, the wires can be positioned and locked into place as needed to maximize the number of boxes being held vertically. Depending on the number of wires used and the shapes and sizes of boxes, up to eight or more can be stored in a minimal amount of space, in accordance with a preferred version of the invention.

In some examples, the main structure of the wrap stand is formed by identical matching halves which are secured to a center base by way of eight locking clips. Alternatively, these can also be held together with glue or sonic welding.

When assembled into a single structure, in some versions it resembles a rectangular shape and naturally provides a built-in and rounded handle at the top. The bottom of the unit, in one version, has two soft non-skid pads to keep the unit from slipping or sliding while in use. The unit is held vertically by placing two of the bent wires into the bottom-most holes on each side.

Due to the special design of the bent wires, the extended downward supports are at the same level as the bottom of the wrap stand itself and therefore provide a wide base to balance the structure on the cabinet floor and hold it upright. At the same time, the design of the wires incorporate an upward and rounded bend that acts as a "lip" to hold the bottom of the boxes close to the structure when in their storage position.

These wires may also be inverted 180 degrees so that the rounded and bent wire can also be downward-oriented while the supports can be upward-oriented since, in one version, they are the exact same height above and below the wires that are inserted into the holes in the wrap stand structure.

In one version, the wrap stand includes a central pillar having a base, the central pillar extending upwardly from the base in a vertical direction when the base is resting on a horizontal surface.

The central pillar may have a first plurality of slots arranged in a first column and a second plurality of slots arranged in a second column, the first column being spaced apart from the second column, wherein the first plurality of slots and the second plurality of slots cooperate to form a first plurality of pairs of slots.

The central pillar may also have a third plurality of slots arranged in a third column and a fourth plurality of slots arranged in a fourth column, the third column being spaced apart from the fourth column wherein the third plurality of slots and the fourth plurality of slots cooperate to form a second plurality of pairs of slots.

The pillar is designed to accommodate a plurality of wires, each of the plurality of wires having a first lateral foot transitioning to a first elongated extension and a second lateral foot transitioning to a second elongated extension, a first upward lip and a first downward lip being positioned between the first elongated extension and the second elongated extension.

Each of the plurality of wires is preferably designed to be removably insertable into one of the first plurality of pairs of slots or the second plurality of pairs of slots, wherein when a first one of the plurality of wires is inserted into a first one of the plurality of pairs of slots, the first elongated extension and the second elongated extension extend horizontally away from the central pillar in a first direction, the first upward lip extends upwardly away from the base, and the first downward lip extends downwardly toward the base.

In some versions, the central pillar comprises a first outer face and an opposing second outer face, the first and second columns of slots being formed in the first outer face, the third and fourth columns of slots being formed in the second outer face.

Most preferably, each of the first plurality of slots comprise a first depth from an interior location to the first outer face, and each of the second plurality of slots comprise a second depth from an interior location the second outer face. Likewise, each of the slots from among the first, second, third, and fourth pluralities of slots further having an upper edge and a lower edge. In this arrangement, when the first one of the plurality of wires is inserted into the first one of the plurality of pairs of slots, the lower edges of the first plurality of pairs of slots engages the first elongated extension and the second elongated extension to prevent rotation of the first one of the plurality of wires.

In some versions, the central pillar further comprises a central opening defined between the first column of slots and the second column of slots, the central opening being formed as a through-hole within the central pillar.

In a preferred example, the central pillar further comprises a central divider positioned between the first outer face and the second outer face, the central divider being configured to prevent the first one of the plurality of wires from extending beyond the central divider and into the second outer face, and further wherein the first depth is defined from the central divider to the first outer face and the second depth is defined from the central divider to the second outer face.

In some examples, the first outer face comprises a plurality of ribs formed on an interior of the first outer face, the plurality of ribs being positioned between adjacent slots from among the first plurality of slots and the second plurality of slots.

In some versions, the plurality of ribs are formed as Y-shaped ribs, the upper end of the Y-shaped rib being positioned toward an outer end of the central pillar, whereby when a lateral foot from one of the pluralities of wires is received between a pair of adjacent ribs from among the plurality of ribs, the lateral foot engages each of the upper ends of the adjacent ribs.

In a preferred example, each of the plurality of wires is formed from a continuous wire, each one of the plurality of wires extending from the first lateral foot, transitioning to a first elongated extension, which transitions to a first downward lip, a first upward lip, and a second downward lip, which transitions to a second elongated extension, which transitions to a second lateral foot.

Similarly, in some examples each of the plurality of wires is formed from a continuous wire, each one of the plurality of wires extending from the first lateral foot, transitioning to a first elongated extension, which transitions to a first upward lip, a first downward lip, and a second upward lip, which transitions to a second elongated extension, which transitions to a second lateral foot.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
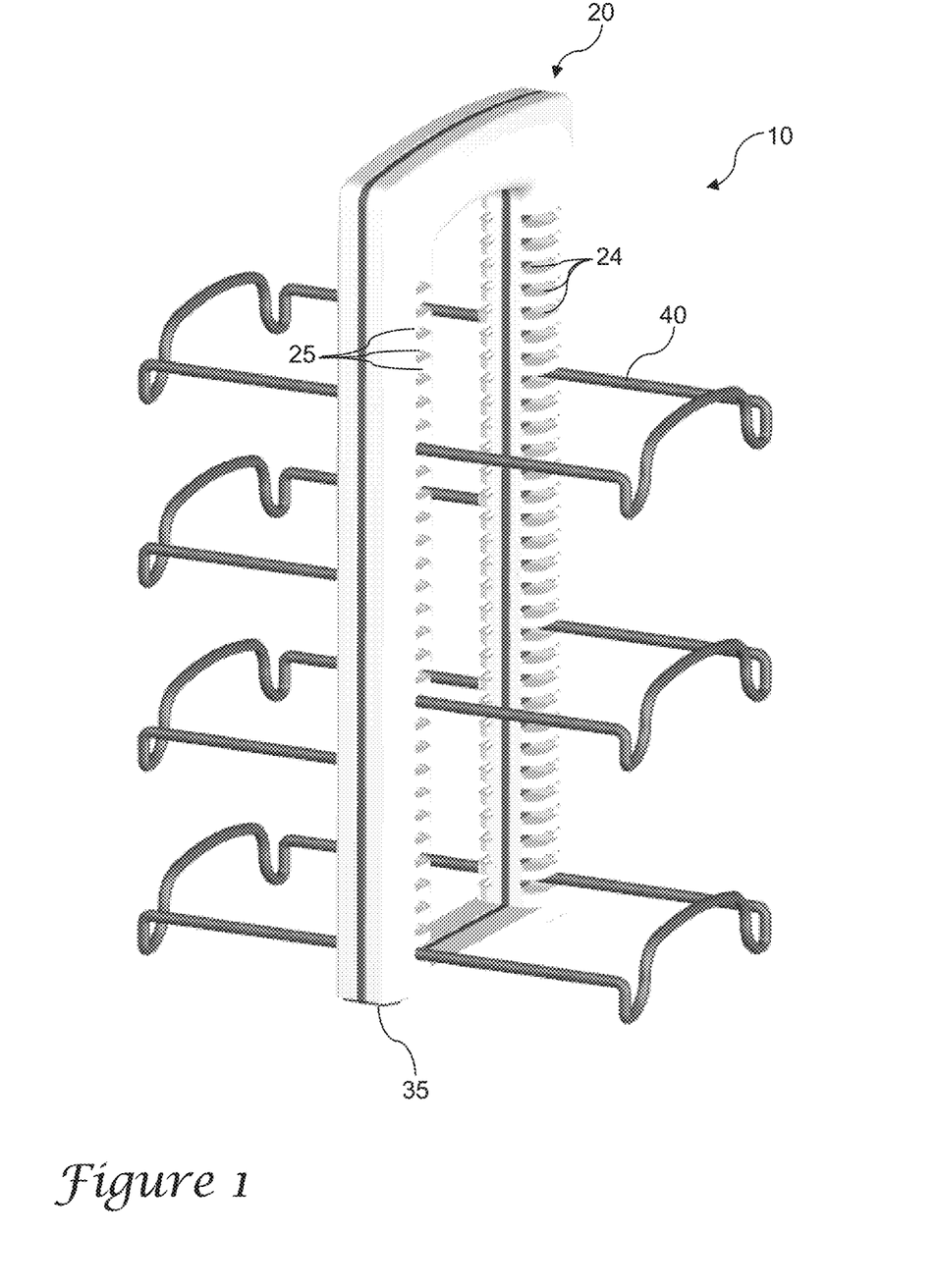
FIG. 1 is a front top isometric view of a preferred wrap stand.
Figure 2:
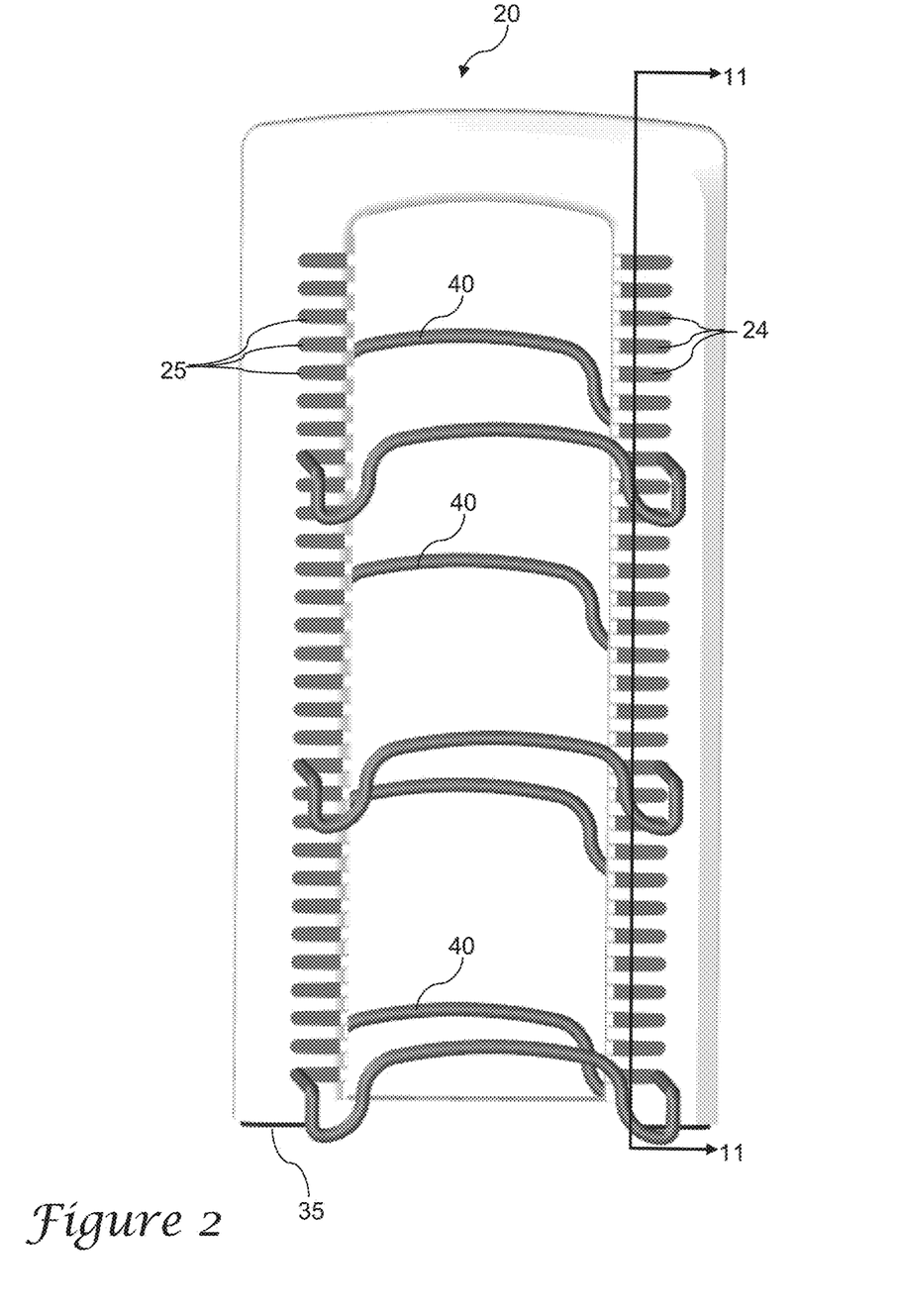
FIG. 2 is a side elevational view of a preferred wrap stand.

A preferred wrap stand 10, as illustrated for example in FIGS. 1 and 2, is formed with a central pillar or tower structure 20 having a number of slots 24, 25 configured to adjustably receive a plurality of shelves at heights along the pillar that are selected by a user. In a preferred example, the shelves are formed as bent wires 40 that provide a horizontal platform with respect to the vertical pillar. As further described below, the preferred wire configuration includes a number of bends to form an upper and a lower lip for retaining a stored item, such as a container of a food wrap, on the wire shelf.

Figure 3:
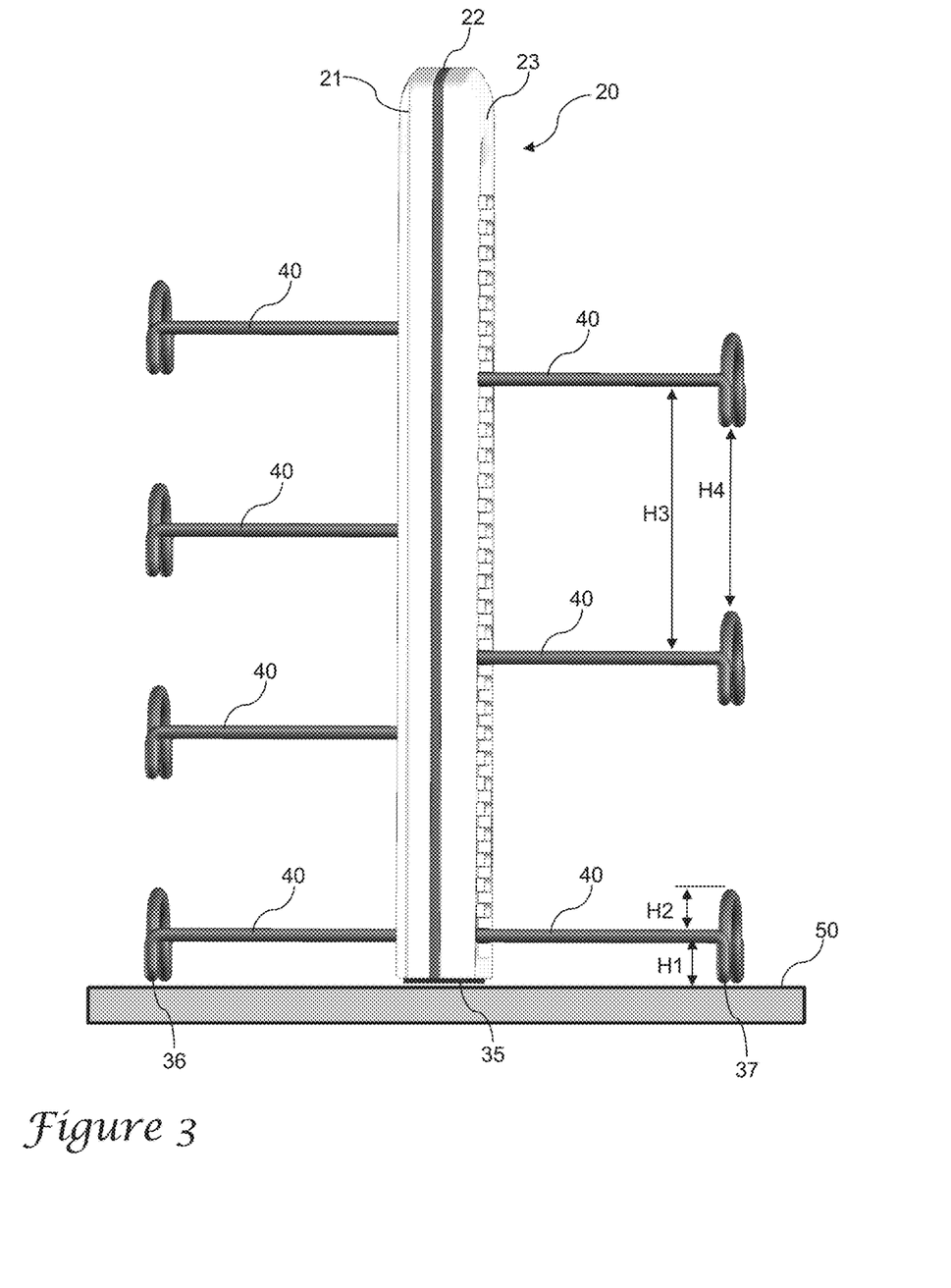
FIG. 3 is a front elevational view of a preferred wrap stand.
Figure 4A:
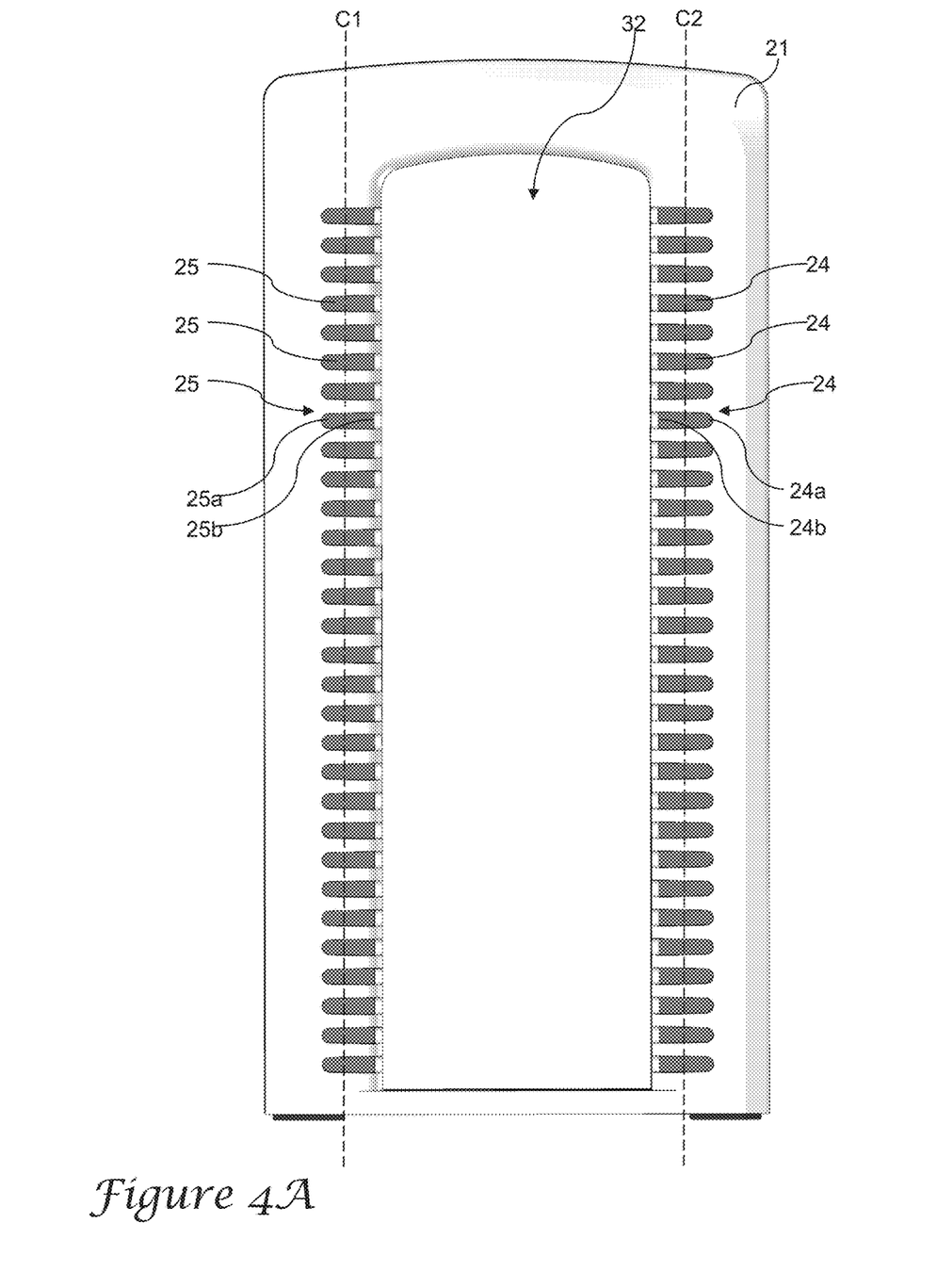
FIG. 4A is a front elevational view of a first outer face for a preferred wrap stand.
Figure 4B:
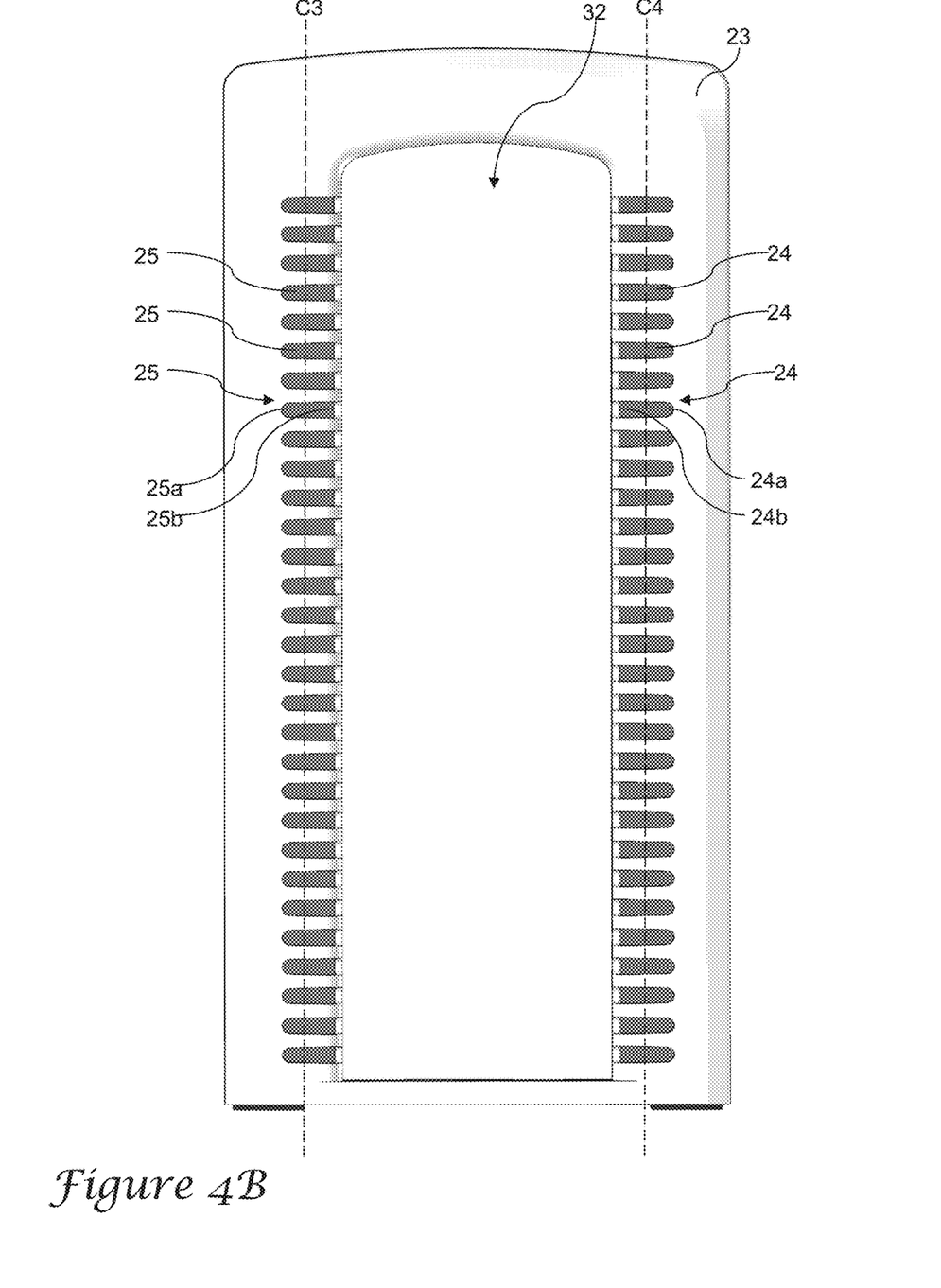
FIG. 4B is a front elevational view of an opposing second outer face for a preferred wrap stand.

In one example, with reference to FIG. 3, the central pillar is configured in three sections, including a first outer face 21, a second outer face 23, and a central divider 22. In one version, the first outer face 21 and second outer face 23 are identical. Each of the first outer face and the second outer face is preferably formed as a generally elongated rectangle, such as seen in FIG. 4A showing a first outer face 21 and in FIG. 4B showing a second outer face 23, each having an opening 32, 33 at the center. At each side of the central opening, such as illustrated in FIG. 4A, the first and second outer faces are each formed with parallel vertical columns of slots 24, 25, including first column C1 and second column C2. The second outer face 23 is formed the same way, having third and fourth columns C3, C4. The slots are configured to receive an end of the bent wires forming the shelves, such that the plurality of slots provides a plurality of possible shelf locations. As the first and second outer faces are symmetrical to one another in the preferred version, the preferred example of the invention includes four columns of slots, configured as first and second columns of slots on a first side 21 of the central pillar, and third and fourth columns of slots on the second side 23 of the central pillar.

Figure 9:
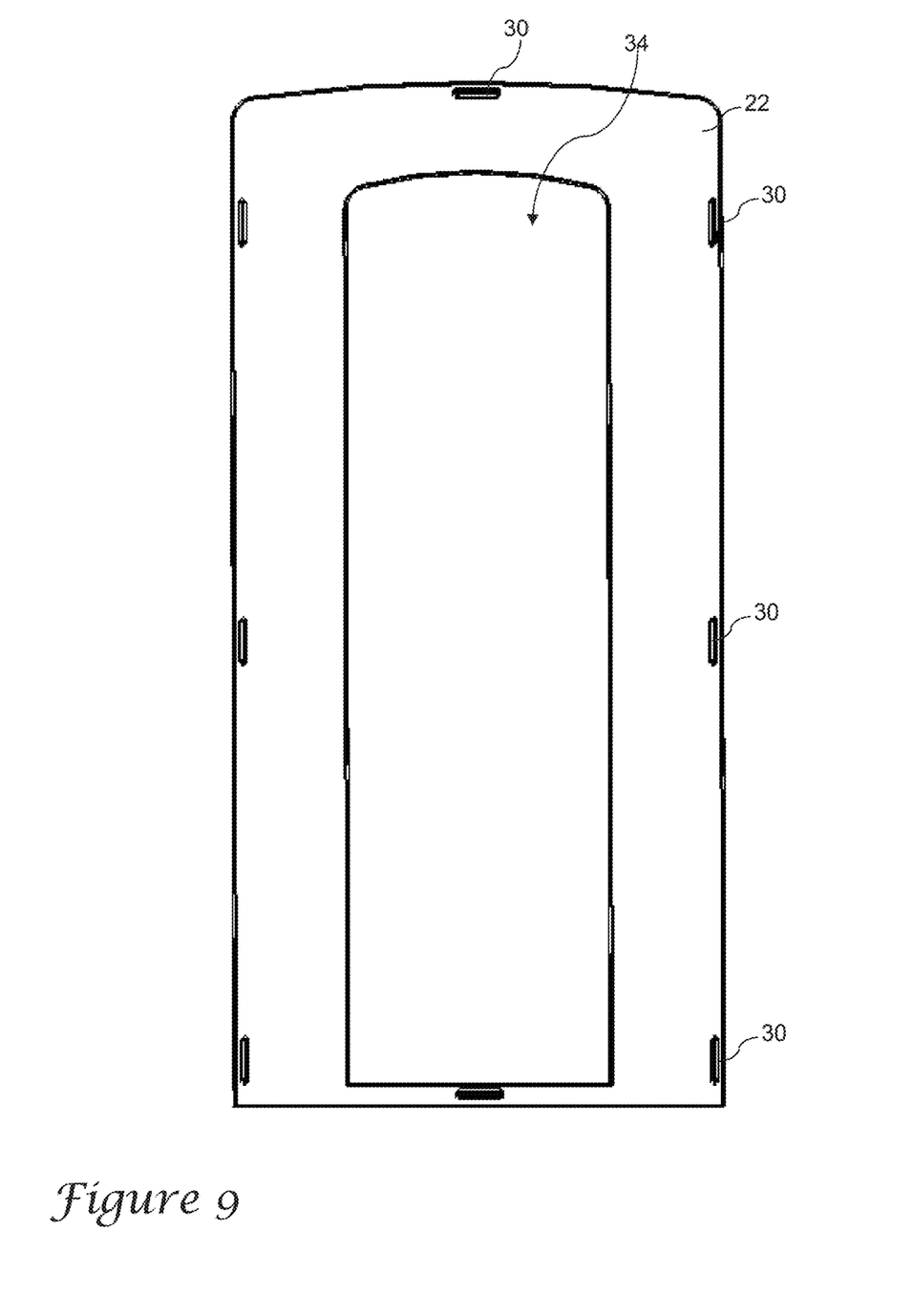
FIG. 9 is a front elevational view of a central divider for a preferred wrap stand.

In the version incorporating three sections to form the pillar, preferably the central divider is sandwiched between the first outer face and the second outer face. Most preferably, the central divider is formed as a thin planar sheet with one or more features for joining it to the first and second outer faces. In one example, as shown in FIG. 9, the central divider includes several tabs 30 formed on each side of the planar sheet while each of the first and second outer faces include a corresponding number of slots 26 located to receive the tabs. The three sections may be joined together by inserting the tabs into the slots. Adhesives, sonic welding, or other fastening means may also be used. In other versions, the sections are joined together using other mechanical structures, or may be joined solely using adhesives or sonic welding. The central divider 22 includes an opening 34 at the center, as with the first and second outer faces.

The central divider serves to provide a backstop for the ends of the wires as they are inserted into the slots within the first or second outer faces, thereby ensuring that the wires do not extend all the way through the opposite side of the pillar, and further improving the retention of the wires. In other versions of the invention, however, a central divider is not used.

The central pillar 20 is configured to rest on a horizontal surface 50, as shown in FIG. 3, which may be a shelf within a cabinet, a countertop, or other such surfaces. When placed on such a horizontal surface, the pillar is configured to extend vertically upward, perpendicular to the horizontal surface. In the illustrated example, the pillar includes a central base 35 which may comprise an elastomeric foot at the bottom of the pillar, to improve the grip of the pillar on the surface and impede sliding of the pillar on the surface. Lowermost edges 36, 37 of wires 40 placed on either side of the pillar may be positioned to lie in the same horizontal plane as the central base 35, to improve the support for the pillar and prevent tipping.

Figure 5:
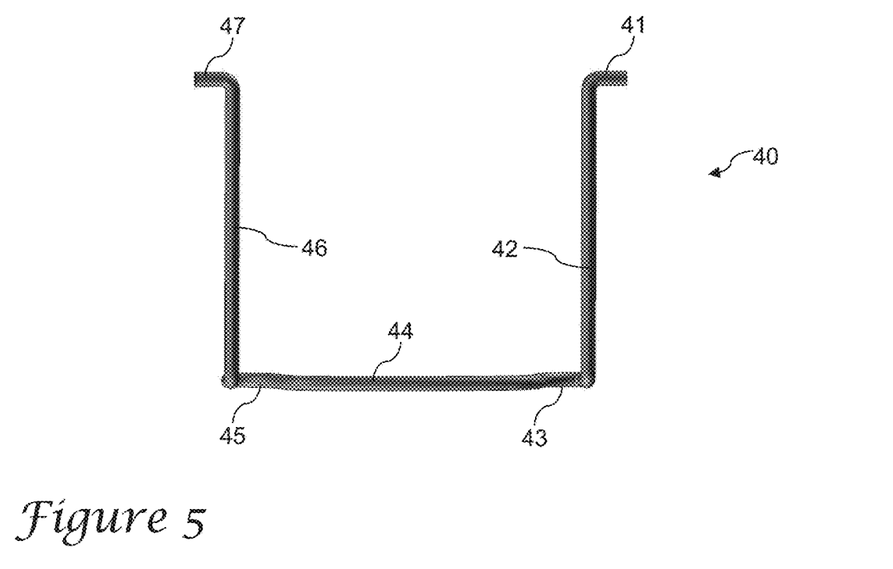
FIG. 5 is a top view of a preferred wire, formed as a shelf for use in a preferred wrap stand.
Figure 6:
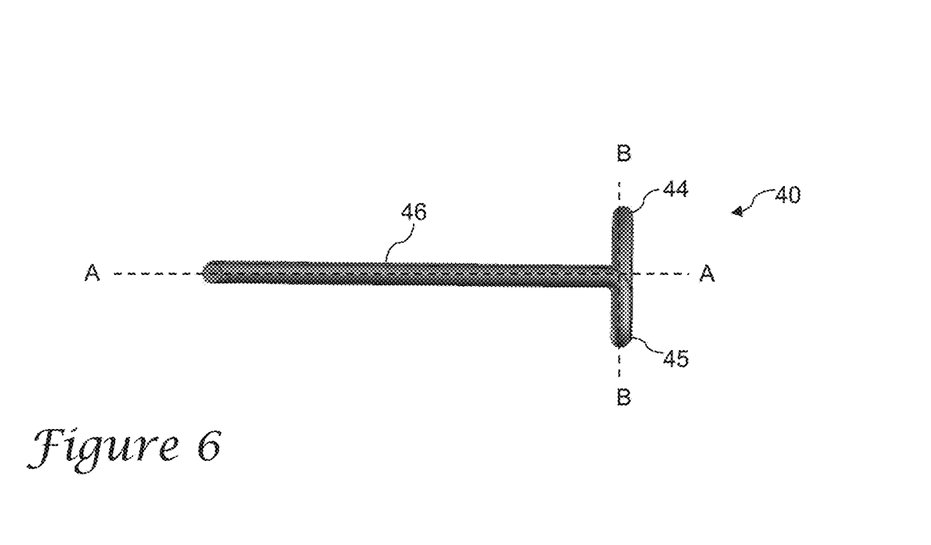
FIG. 6 is a side elevational view of the wire of FIG. 4.
Figure 7:
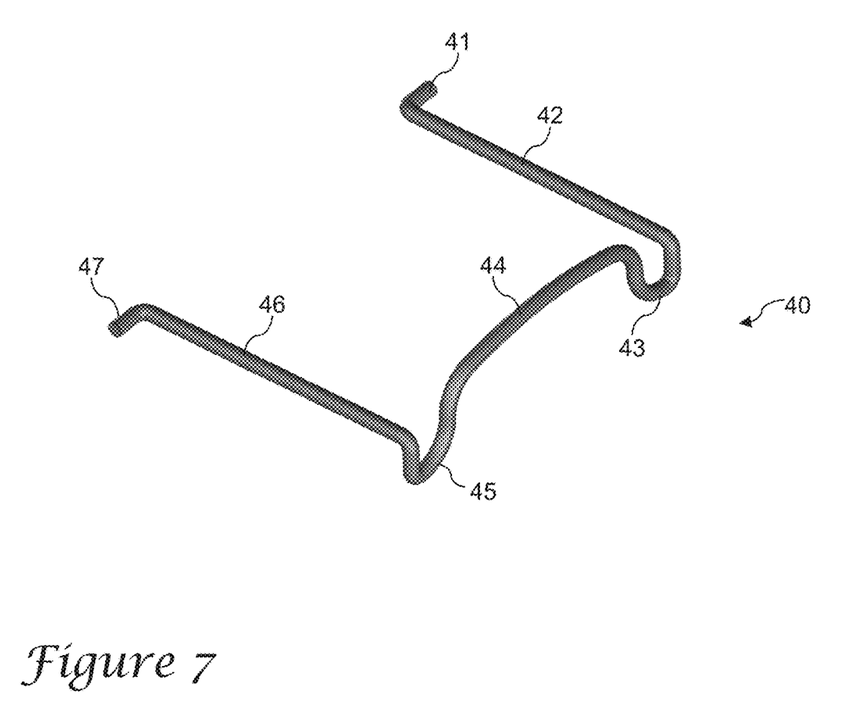
FIG. 7 is an isometric view of the wire of FIG. 4.

The preferred wire shelf 40 is formed generally as a U-shape when viewed from the top (as in FIG. 5), and when viewed from the side it forms a T-shape in which the T is turned 90 degrees onto its side (as in FIG. 6). Thus, in the illustrated version, the wire shelf includes a pair of opposing elongated extensions 42, 46 which serve as the support structure for the shelf when the wire is in place and secured to the pillar. Each of the two extensions has a first end that terminates in a lateral foot 41, 47, each of which is preferably formed as a perpendicular bend at the terminal end of each of the elongated extensions. The opposite second ends of each of the shelf support extensions are joined by a cross member that preferably forms an upward lip and a downward lip. Thus, as illustrated, the first elongated extension 42 transitions to a first downward lip 43 which extends perpendicularly toward the second elongated extension 46. As the wire continues toward the second elongated extension it then transitions to a first central upward lip 44, and then a second downward lip 45, before transitioning to the second elongated extension 46. In the illustrated example, each of these portions of the shelf is formed in a single unitary wire, bent in order to form the separate features as described above. In other versions, the shelf may be formed from different materials, more than one wire, or with upward and downward lips attached to the end of a wire shelf.

As best seen in the side view, the first and second lateral extensions extend along a common first plane A-A, thereby providing a planar support shelf. In the illustrated example the lateral extensions are fully within the plane, though in other versions they may be only substantially within the first plane (such as, for example, being formed with one or more undulations along the length of the extensions). The upward lip 44 and downward lip 45 are preferably formed as structures that are perpendicular to the first plane A-A as viewed from the side, and lie in a second plane B-B, perpendicular to the first plane A-A. Thus, as shown, the central upward lip 44 projects upward within plane B-B while the first and second downward lips 43, 45 extend downwardly within plane B-B. In other versions the upward and downward lips are not necessarily orthogonal to the first plane, but rather they extend upward or downward from the first plane so that they are merely transverse to the first plane.

The illustrated bent wire shelf is shown with an orientation in which there are a pair of downward lips and one upward lip. This orientation can be reversed by inverting the wire shelf, and therefore the configuration can be changed accordingly. Likewise, the bent wire may be formed to include only one upward and one downward lip, or may have a greater number of bends to form a greater number of lips. Still further, the upward and downward lips may not be formed as bends in a single wire, but could be formed as structures attached to a wire or other shelf support member. Preferably the wire includes at least one upward and at least one downward lip, but other versions may incorporate additional lips in either direction.

In one version of the invention, with reference to FIG. 3, the downward lips extend for a distance H1 below the first plane of the extension members, and the upward lips extend for a second distance H2 above the first plane. In one example, the distances H1 and H2 are equal, but in other versions H2 may be greater than H1. Preferably, at least one pair of slots formed in the pillar are located at a height H1 such that the lower lip (or lips) serves as peripheral feet to provide stable support for the device on a shelf. By inserting a wire shelf member into slots at each side of the tower, the lower lips on each side will provide support on the horizontal surface. Most preferably, the pillar includes slots positioned such that the bottom edges 36, 37 of the lower lip on each of the opposing wire shelf members 40 will be in the same horizontal plane as the bottom 35 of the pillar, such that each of them rests on a horizontal surface 50 at the same time.

The slots 24, 25 formed in the pillar faces preferably include an interior end 24b, 25b and an exterior end 24a, 25a, as seen in FIG. 3, with the interior end being closer to the interior of the open space 32 and the exterior end extending peripherally away. In one example, the interior end is formed to be wider than the exterior end, which is narrower. The diameter of the wire is also preferably sized to be close to the height of the slot at the exterior end, and in one version the diameter of the wire is larger than the height at the exterior end, so that the wire is frictionally held within the slot at the exterior end.

Figure 8:
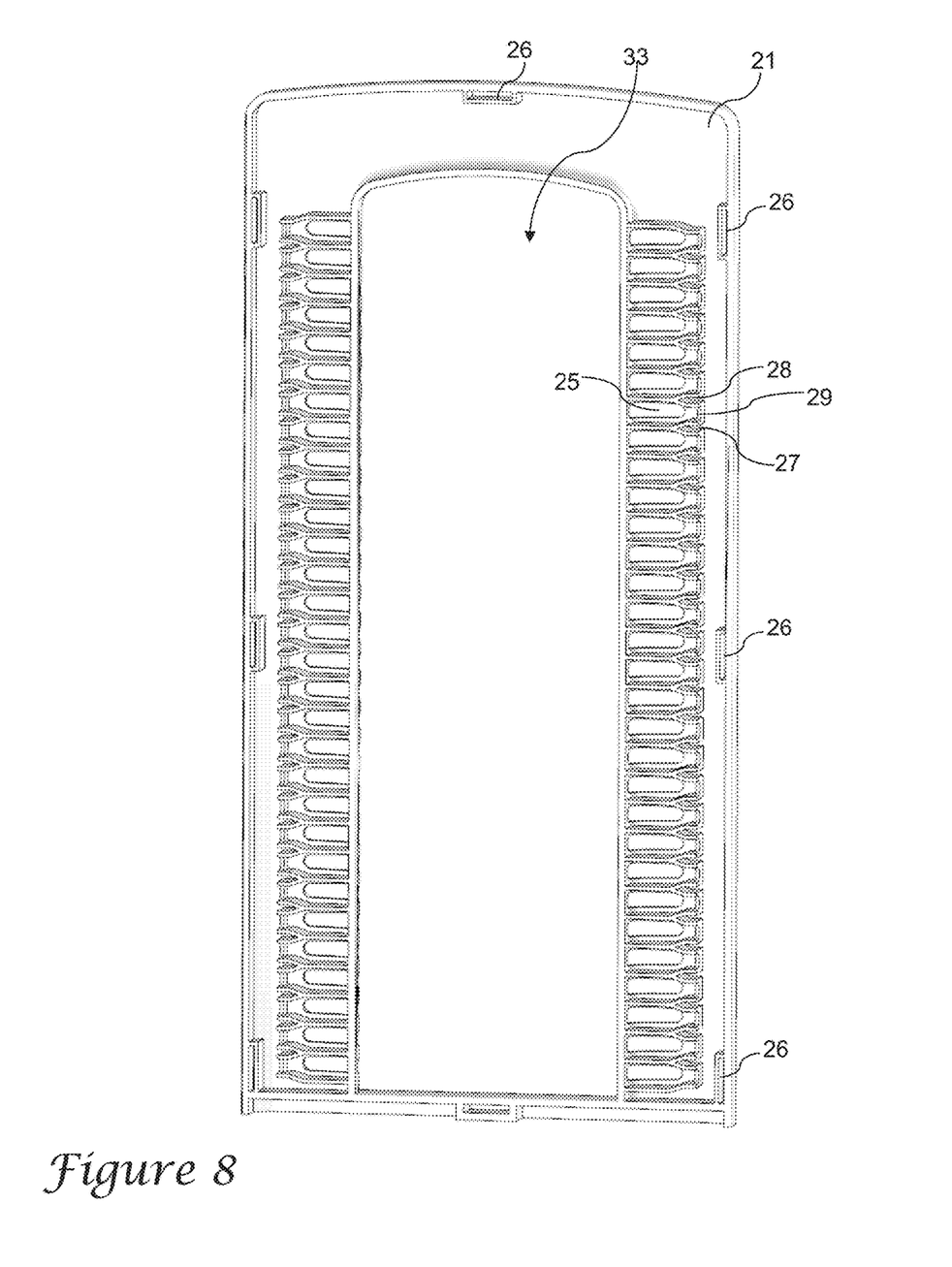
FIG. 8 is a rear elevational view of an outer face for a preferred wrap stand.
Figure 10:
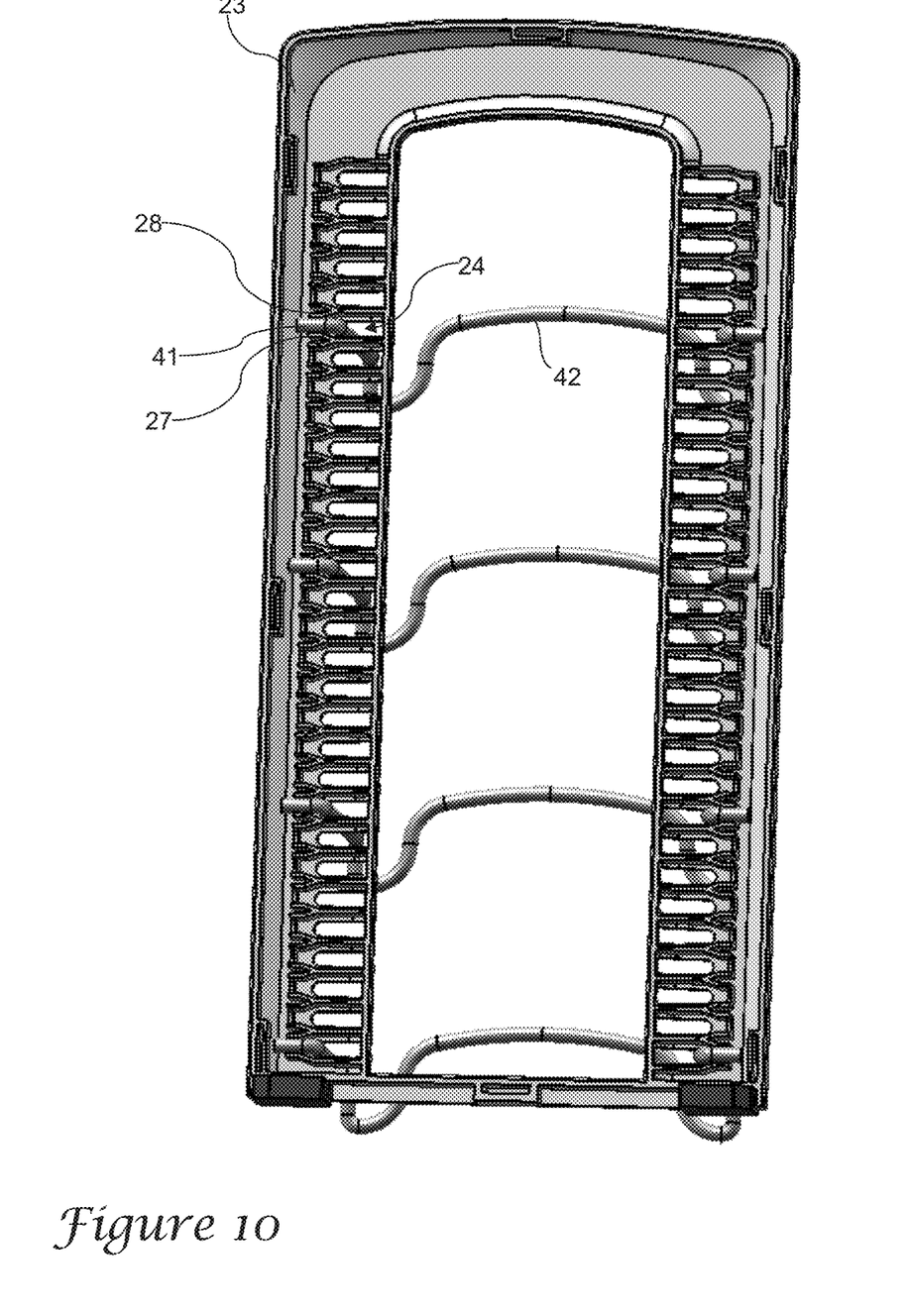
FIG. 10 is an isometric view of an outer face for a preferred wrap stand, illustrated with a number of wires attached.

The inside surface of each of the first outer face 21 and second outer face 23 is preferably formed with a series of ribs that provide structural support around the slots, such as shown in FIG. 8 illustrating the first outer face 21, and in FIG. 10 illustrating the second outer face 23. In one version, the ribs include a Y-shaped rib so that each slot is bounded by an upper angled rib 28 and a lower angled rib 27, defining a channel 29 between them. This channel is also preferably sized to provide a snug fit for the terminal end or foot 41 of the wire, thereby impeding removal of the wire from the slot.

Figure 11:
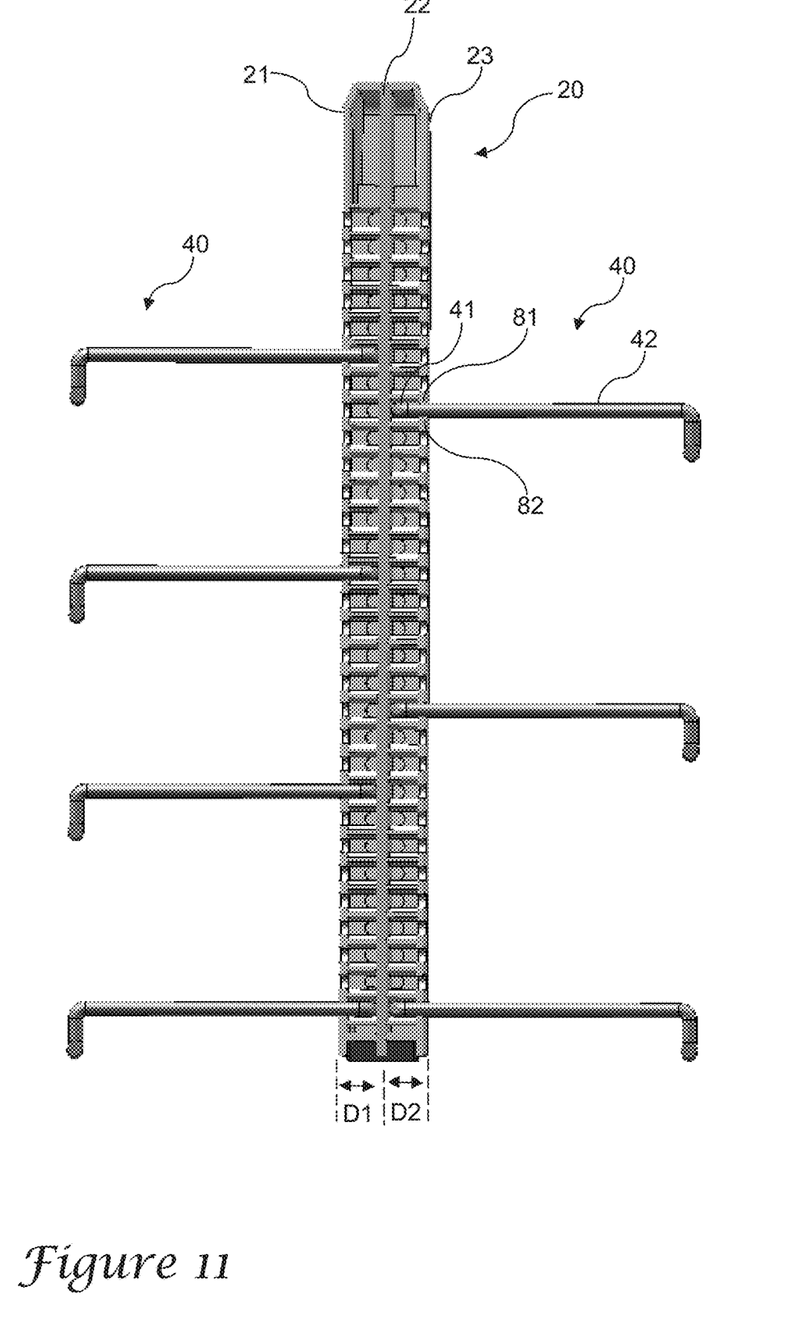
FIG. 11 is a sectional view of a portion of a preferred central pillar, taken along plane 11-11 from FIG. 2.

The central pillar 20 also preferably has a depth to it, so that the wires 40 extend into the slots a minimum distance to prevent them from rotating. As best seen in the sectional view of FIG. 11, the terminal foot 41 of one of the wires 40 is within the central pillar for a distance D2 such that the upper edges 81 and lower edges 82 of the slots engage the elongated extension 42 portion of the wire at an upper and lower surface of the elongated extension portion of the wire. The lateral foot serves as a pivot attachment of the wire, preventing the wire from being pulled out laterally in the direction of the elongated extension, while the relatively snug upper and lower surfaces of the slot prevent the wire from rotating either upward or downward within the slots. The same arrangement is provided on the opposite side, with a distance D1 provided between the central divider and the outer edge of the first surface 21 of the central pillar. To better achieve the insertion and holding of the wires in the slots, the slots are configured with a portion of the slot facing toward the central opening of the pillar, and a portion facing a direction approximately 90 degrees away, so that the slots are formed with an L-shape.

Figure 12:
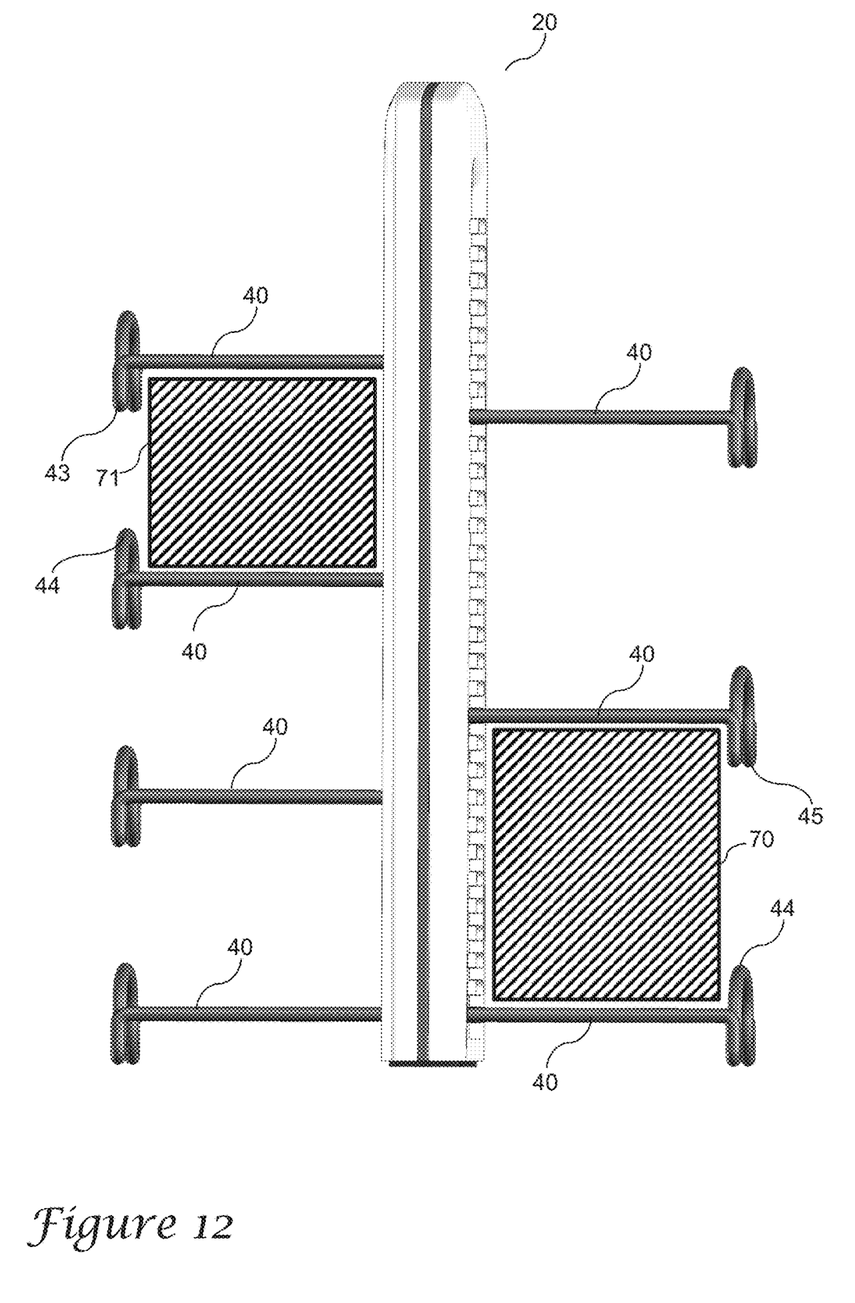
FIG. 12 is a front elevational view of a preferred wrap stand, shown with a pair of representative boxes containing wraps held in the stand.

In use, a plurality of wire shelf members are inserted into the desired slots from among the parallel columns of slots. The wires are preferably formed with a natural bias that is slightly wider than the outermost width of the slots, so that an inward urging force is required to both insert the wire shelf members and to remove them. As seen in FIG. 12, the wire shelves 40 are positioned as desired to accommodate the dimensions of a particular box of wrap (such as foil or plastic wrap) 70, 71. The boxes 70, 71 are shown in end view in FIG. 12, and should be understood to be generally in the form of an elongated rectangular box. In the configuration as shown, the boxes of wrap may be readily removed by sliding them in and out of the tower, but they will not fall from the shelves (that is, they cannot move in a direction leftward or rightward as shown in FIG. 12).

The insertion of one shelf member above another shelf member provides a shelf separation height H3 (see FIG. 3) between the horizontally extending extension members of the wire shelves. The selection of the desired slots allows a user to determine the height H3, and thereby the size of the shelf to be tailored to a particular package for a wrap or other item. The distal ends of the shelf members terminate with the upper and lower lips, as described above, and which define a lip separation height H4. As illustrated, the shelf separation height H3 is greater than the lip separation height H4, so that the lips serve to retain the packaging on the shelf. The entire unit can be stored inside a cabinet or other location, with the shelf members arranged as desired in order to accommodate wrap packages of varying sizes.

In alternate versions of the invention, only an upwardly or downwardly extending lip (but not both) is provided in the shelf members. The inclusion of both lips is preferred, however, to provide a better retention of both an upper and lower corner of a package.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A wrap stand, comprising:
   a central pillar having a base, the central pillar extending upwardly from the base in a vertical direction when the base is resting on a horizontal surface, the central pillar having a first plurality of slots arranged in a first column and a second plurality of slots arranged in a second column, the first column being spaced apart from the second column;
   the central pillar further having a third plurality of slots arranged in a third column and a fourth plurality of slots arranged in a fourth column, the third column being spaced apart from the fourth column;
   wherein the central pillar comprises a first outer face and an opposing second outer face, the first and second columns of slots being formed in the first outer face, the third and fourth columns of slots being formed in the second outer face;
   a plurality of wires removably insertable into a first pair of slots, the first pair of slots comprising one of the first plurality of slots and one of the second plurality of slots, wherein each of the plurality of wires includes a first lateral foot transitioning to a first elongated extension and a second lateral foot transitioning to a second elongated extension, a first upward lip and a first downward lip being positioned between the first elongated extension and the second elongated extension, wherein the first lateral foot and the second lateral foot are insertable into the first pair of slots;
   wherein the central pillar further comprises a central divider positioned between the first outer face and the second outer face, the central divider being configured to prevent the first one of the plurality of wires from extending beyond the central divider and into the second outer face;
   the first outer face further having a plurality of ribs formed on an interior of the first outer face, the plurality of ribs being positioned between adjacent slots from among the first plurality of slots and the second plurality of slots;
   further wherein when a first one of the plurality of wires is inserted into the first pair of slots, the first elongated extension and the second elongated extension extend horizontally away from the central pillar in a first direction, the first upward lip extends upwardly away from the base and upwardly with respect to the first elongated extension and the second elongated extension, and the first downward lip extends downwardly toward the base and downwardly with respect to the first elongated extension and the second elongated extension; and
   further wherein when a second one of the plurality of wires is inserted into a second pair of slots comprising one of the third plurality of slots and one of the fourth plurality of slots, the first elongated extension and the second elongated extension of the second one of the plurality of wires extends horizontally away from the central pillar in a second direction, the second direction being opposite to the first direction.

2. The wrap stand of claim 1, wherein the central pillar further comprises a central opening defined between the first column of slots and the second column of slots, the central opening being formed as a through-hole within the central pillar.

3. The wrap stand of claim 1, wherein the plurality of ribs are formed as Y-shaped ribs, the upper end of the Y-shaped rib being positioned toward an outer end of the central pillar, whereby when a lateral foot from one of the pluralities of wires is received between a pair of adjacent ribs from among the plurality of ribs, the lateral foot engages each of the upper ends of the adjacent ribs.

4. The wrap stand of claim 1, wherein each of the plurality of wires is formed from a continuous wire, each one of the plurality of wires extending from the first lateral foot, transitioning to the first elongated extension, which transitions to the first downward lip, the first upward lip, and a second downward lip, which transitions to the second elongated extension, which transitions to the second lateral foot.

5. The wrap stand of claim 1, wherein each of the plurality of wires is formed from a continuous wire, each one of the plurality of wires extending from the first lateral foot, transitioning to the first elongated extension, which transitions to the first upward lip, the first downward lip, and a second upward lip, which transitions to the second elongated extension, which transitions to the second lateral foot.

6. The wrap stand of claim 1, further comprising a depth between the central divider and the first outer face, wherein the first pair of slots engage the first elongated extension and the second elongated extension when the first one of the plurality of wires is inserted into the first pair of slots.

7. A wrap stand, comprising:
   a central pillar having a base, the central pillar extending upwardly from the base in a vertical direction when the base is resting on a horizontal surface;
   the central pillar having a first plurality of slots arranged in a first column and a second plurality of slots arranged in a second column, the first column being spaced apart from the second column, wherein the first plurality of slots and the second plurality of slots cooperate to form a first plurality of pairs of slots;
   the central pillar having a third plurality of slots arranged in a third column and a fourth plurality of slots arranged in a fourth column, the third column being spaced apart from the fourth column wherein the third plurality of slots and the fourth plurality of slots cooperate to form a second plurality of pairs of slots; and
   a plurality of wires, each of the plurality of wires having a first lateral foot transitioning to a first elongated extension and a second lateral foot transitioning to a second elongated extension, a first upward lip and a first downward lip being positioned between the first elongated extension and the second elongated extension; and each of the plurality of wires being removably insertable into one of the first plurality of pairs of slots or the second plurality of pairs of slots;

wherein when a first one of the plurality of wires is inserted into a first one of the plurality of pairs of slots, the first elongated extension and the second elongated extension extend horizontally away from the central pillar in a first direction, the first upward lip extends upwardly away from the base and upwardly with respect to the first elongated extension and the second elongated extension, and the first downward lip extends downwardly toward the base and downwardly with respect to the first elongated extension and the second elongated extension;

the central pillar further having a first outer face and an opposing second outer face, the first and second columns of slots being formed in the first outer face, the third and fourth columns of slots being formed in the second outer face;

each of the first plurality of slots having a first depth from an interior location to the first outer face;

each of the second plurality of slots having a second depth from an interior location the second outer face;

each of the slots from among the first, second, third, and fourth pluralities of slots further having an upper edge and a lower edge;

wherein when the first one of the plurality of wires is inserted into the first one of the plurality of pairs of slots, the lower edges of the first plurality of pairs of slots engages the first elongated extension and the second elongated extension to prevent rotation of the first one of the plurality of wires.

8. The wrap stand of claim 7, wherein the central pillar further comprises a central opening defined between the first column of slots and the second column of slots, the central opening being formed as a through-hole within the central pillar.

9. The wrap stand of claim 7, wherein the central pillar further comprises a central divider positioned between the first outer face and the second outer face, the central divider being configured to prevent the first one of the plurality of wires from extending beyond the central divider and into the second outer face, and further wherein the first depth is defined from the central divider to the first outer face and the second depth is defined from the central divider to the second outer face.

10. The wrap stand of claim 9, further wherein the first outer face comprises a plurality of ribs formed on an interior of the first outer face, the plurality of ribs being positioned between adjacent slots from among the first plurality of slots and the second plurality of slots.

11. The wrap stand of claim 10, wherein the plurality of ribs are formed as Y-shaped ribs, the upper end of the Y-shaped rib being positioned toward an outer end of the central pillar, whereby when a lateral foot from one of the pluralities of wires is received between a pair of adjacent ribs from among the plurality of ribs, the lateral foot engages each of the upper ends of the adjacent ribs.

12. The wrap stand of claim 7, wherein each of the plurality of wires is formed from a continuous wire, each one of the plurality of wires extending from the first lateral foot, transitioning to the first elongated extension, which transitions to the first downward lip, the first upward lip, and a second downward lip, which transitions to the second elongated extension, which transitions to the second lateral foot.

13. The wrap stand of claim 7, wherein each of the plurality of wires is formed from a continuous wire, each one of the plurality of wires extending from the first lateral foot, transitioning to the first elongated extension, which transitions to the first upward lip, the first downward lip, and a second upward lip, which transitions to the second elongated extension, which transitions to the second lateral foot.

14. The wrap stand of claim 7, wherein the first downward lip extends below the first elongated extension for a first height and further wherein the first one of the plurality of pairs of slots is positioned above the base at a distance equal to the first height.

15. The wrap stand of claim 14, wherein the first upward lip extends above the first elongated extension for a second height, the first height being equal to the second height.

* * * * *